United States Patent
Plummer et al.

(10) Patent No.: US 7,240,341 B2
(45) Date of Patent: Jul. 3, 2007

(54) GLOBAL CONSTANT POOL TO ALLOW DELETION OF CONSTANT POOL ENTRIES

(75) Inventors: Wayne Plummer, High Wycombe (GB); Jerry Kramskoy, Long Ditton (GB)

(73) Assignee: Esmertec AG, Dubendorf (CH)

( * ) Notice: Subject to any disclaimer, the term of this patent is extended or adjusted under 35 U.S.C. 154(b) by 714 days.

(21) Appl. No.: 10/203,123

(22) PCT Filed: Feb. 7, 2001

(86) PCT No.: PCT/IB01/00457

§ 371 (c)(1),
(2), (4) Date: Mar. 7, 2003

(87) PCT Pub. No.: WO01/57649

PCT Pub. Date: Aug. 9, 2001

(65) Prior Publication Data

US 2003/0172194 A1    Sep. 11, 2003

Related U.S. Application Data

(60) Provisional application No. 60/180,554, filed on Feb. 7, 2000.

(51) Int. Cl.
*G06F 9/45*   (2006.01)
*G06F 9/44*   (2006.01)
(52) U.S. Cl. .................. 717/148; 717/166; 717/151
(58) Field of Classification Search ............... 717/148, 717/166, 151
See application file for complete search history.

(56) References Cited

U.S. PATENT DOCUMENTS 5,815,718 A  *  9/1998  Tock .......................... 717/166

(Continued)

FOREIGN PATENT DOCUMENTS

EP    0810522 A2   12/1997

(Continued)

OTHER PUBLICATIONS

Conte et al., "A Study of Code Reuse and Sharing Characteristics of Java Applications", 1998, IEEE, p. 27-35.*
Volanschi et al., "Declarative Specialization of Object-Oriented Programs", 1997, ACM, p. 286-300.*

*Primary Examiner*—Wei Zhen
*Assistant Examiner*—Qamrun Nahar
(74) *Attorney, Agent, or Firm*—Caesar Rivise Bernstein Cohen & Pokotilow, Ltd.

(57) ABSTRACT

A method and apparatus for reducing runtime memory requirements of a virtual machine. The invention involves analyzing object code compiled from source code. The object code includes at least two load-units that each contain a load-unit specific constant pool. Each load-unit is analyzed to determine which constants are actual constants and then those actual constants are analyzed to determine where commonality exists among the load-units. If a constant is determined to be redundant it is rewritten to a global constant pool. The references to the constant in the load-unit specific constant pool are rewritten to point to the value in the global constant pool. The memory allocated to the constant in the individual load-unit is then reallocated, either by a programmed routine or by memory management tools.

7 Claims, 4 Drawing Sheets

U.S. PATENT DOCUMENTS

| | | | |
|---|---|---|---|
| 5,838,980 A * | 11/1998 | Guillen et al. | 717/148 |
| 6,530,080 B2 * | 3/2003 | Fresko et al. | 717/166 |
| 6,922,824 B2 * | 7/2005 | Swetland | 717/161 |
| 6,968,549 B1 * | 11/2005 | Harscoet | 717/166 |
| 2003/0088851 A1 * | 5/2003 | Harscoet | 717/116 |

FOREIGN PATENT DOCUMENTS

| | | |
|---|---|---|
| EP | 0913769 A2 | 5/1999 |
| EP | 09643989 A2 | 9/1999 |

* cited by examiner

GLOBAL CONSTANT POOL TO ALLOW DELETION OF CONSTANT POOL ENTRIES

CROSS-REFERENCE TO RELATED APPLICATIONS

This is a national phase application filed under 35 U.S.C. §371 of International Application No. PCT/IB01/00457, filed on Feb. 7, 2001, now abandoned, which claims priority under 35 U.S.C. §119(e) to U.S. Provisional Patent Application Ser. No. 60/180,554 filed on Feb. 7, 2000, now abandoned.

BACKGROUND OF THE INVENTION

1. Field of Invention

The present invention relates to reducing runtime memory requirements of a virtual machine running a dynamically-linked language. More specifically, the invention relates to a global constant pool that allows for the deletion of load-unit specific constant pool entries.

2. Description of Related Art

The execution or running of a computer program causes certain areas of memory to be allocated for use by the program. For example, whenever an object is created, a certain area of memory having a certain address is set aside for that object. It is difficult to predict how much memory an application program will require (conditions can vary each time the application is run). Thus, computing environments are designed with tools to manage the changing memory requirements of application programs.

In general, memory management involves two related tasks: allocation and recycling. As noted, allocation occurs when the program requests a block of memory. When a request is made, the memory manager must allocate that block of memory out of the larger block of memory it has received from the operating system. The tool that performs this task is known as the "allocator." Recycling involves reusing memory blocks that contain data that is no longer required by the program. The tool that performs this task is often referred to as a "garbage collector."

Java and other programming languages can be implemented in a computing environment that includes a virtual machine. A virtual machine is software that acts like a hardware processor and that runs on top of a host computer's operating system. In a Java environment, the virtual machine includes an interpreter. An interpreter translates and runs a program at the same time. Specifically, the interpreter translates one line of programming, executes that line of code, and then proceeds to the next line of code. Generally, an interpreter translates programming code that has been compiled from source code. For example, before Java source code is interpreted, the source code is translated or compiled into byte code by a compiler. The interpreter converts the byte code to machine language at run time.

Programs that require virtual machines, including programs written in Java and other dynamically-linked languages, are useful in a variety of areas. These programs are often written with the assumption that they will be run on devices with powerful processors and large amounts of memory. However, there is an ever-increasing demand by consumers for electronic gadgetry that is small in size, high in performance, and reasonably priced. However, the small size and power considerations for these devices typically result in small memory footprints. Examples of highly popular devices with small memory footprints include mobile telephones and personal digital assistants. In many cases, the size of the memory available on these devices limits the size and type of applications that can be run on them. In other cases, abbreviated or limited-functionality versions of application programs are developed and installed on small memory footprint devices. Neither situation is acceptable.

BRIEF SUMMARY OF THE INVENTION

Accordingly, there is a need for an improved method and system for reducing runtime memory requirements of a virtual machine running a dynamically-linked language. In particular, there is a need for an improved manner of reducing the size of object code load-units that the virtual machine must verify, load, and interpret.

In a dynamically-linked language, references to entities independent of a given load-unit are typically gathered together to form a load-unit specific constant pool. A reference that is independent of a given load-unit is effectively constant as far as that load-unit is concerned. The use of a load-unit specific constant pool may reduce the overall size of the load-unit if the constant is used more than one time in a particular load-unit. The constant pool is reduced because the constant is written only once and then referenced each time it is needed, instead of writing the constant each time that it is required. A constant can be either a variable or an operation. For Java, an example of a constant variable is a number such as "310359," while an example of a constant operation is a standard method such as "java.lang.System.out.println( )."

At any one time during the runtime of a virtual machine dealing with load-units of a dynamically-linked language, many different load-units may need to be present in memory. A simple program may require only one load-unit, but programs typically require a number of load-units. One way to represent these load-units is to have a separate data structure for each load-unit currently in memory. A load-unit may also be referred to as a class. Each class includes a header, a constant pool, and other references to entities not independent of a given load-unit.

One embodiment of the invention involves identifying common constant values in the set of load-units in memory and gathering them together into a global pool of constants. This requires the modification of all references to such constants so that they are accessed from the global pool rather than the load-unit specific constant pool. The result of creating a global constant pool is that the common constant values can be removed from the load-unit specific constant pool, thereby reducing it in size.

This technique is not appropriate for values that are not truly constant, where the runtime value varies, despite the value in various load-units being ostensibly the same. The runtime value must remain constant for each instance that the value is referenced in order for the constant to be considered an actual constant. Thus, the invention preferably provides a mechanism for determining whether a purported constant is, in fact, a constant.

In another embodiment, the invention is implemented as a method of reducing runtime memory requirements of a virtual machine running a dynamically-linked language. The method includes compiling source code to create object code, where the object code includes at least two load-units. The load units are then analyzed for common constants. The method also includes creating a global constant pool, writing a value of the common constants to the global constant pool, modifying references pointing at the common constants to point at the value written to the global constant pool, and removing each instance of the common constants from the load-units.

In yet another embodiment, the invention is implemented as a programming structure that includes a header, non-constant elements, at least two load-units and a global constant pool. Preferably, each of the at least two load-units includes a load-unit specific constant pool, and the load-unit specific constant pool contains constants of its respective load unit.

The invention also provides a pre-load analysis engine for analyzing load-units with constants. The pre-load analysis engine includes a module for determining if the number of load-units to be loaded is greater than one; a module for analyzing constants of the load-units to determine if the constants are actual constants; a module for analyzing load-unit specific constant pools to determine if the actual constants have commonality in a number of load-unit specific constant pools; a module for determining if a common constant was found; a module for writing a common constant to a global constant pool; and a module for modifying a reference to point at a common constant value written in the global constant pool instead of pointing at the constant in the load-unit.

As is apparent from the above, it is an advantage of the invention to provide a method and apparatus of utilizing a global constant pool to remove constants that have a commonality throughout a number of load-units. Other features and advantages of the present invention will become apparent by consideration of the detailed description and accompanying drawings.

DETAILED DESCRIPTION OF THE INVENTION

Figure 1:
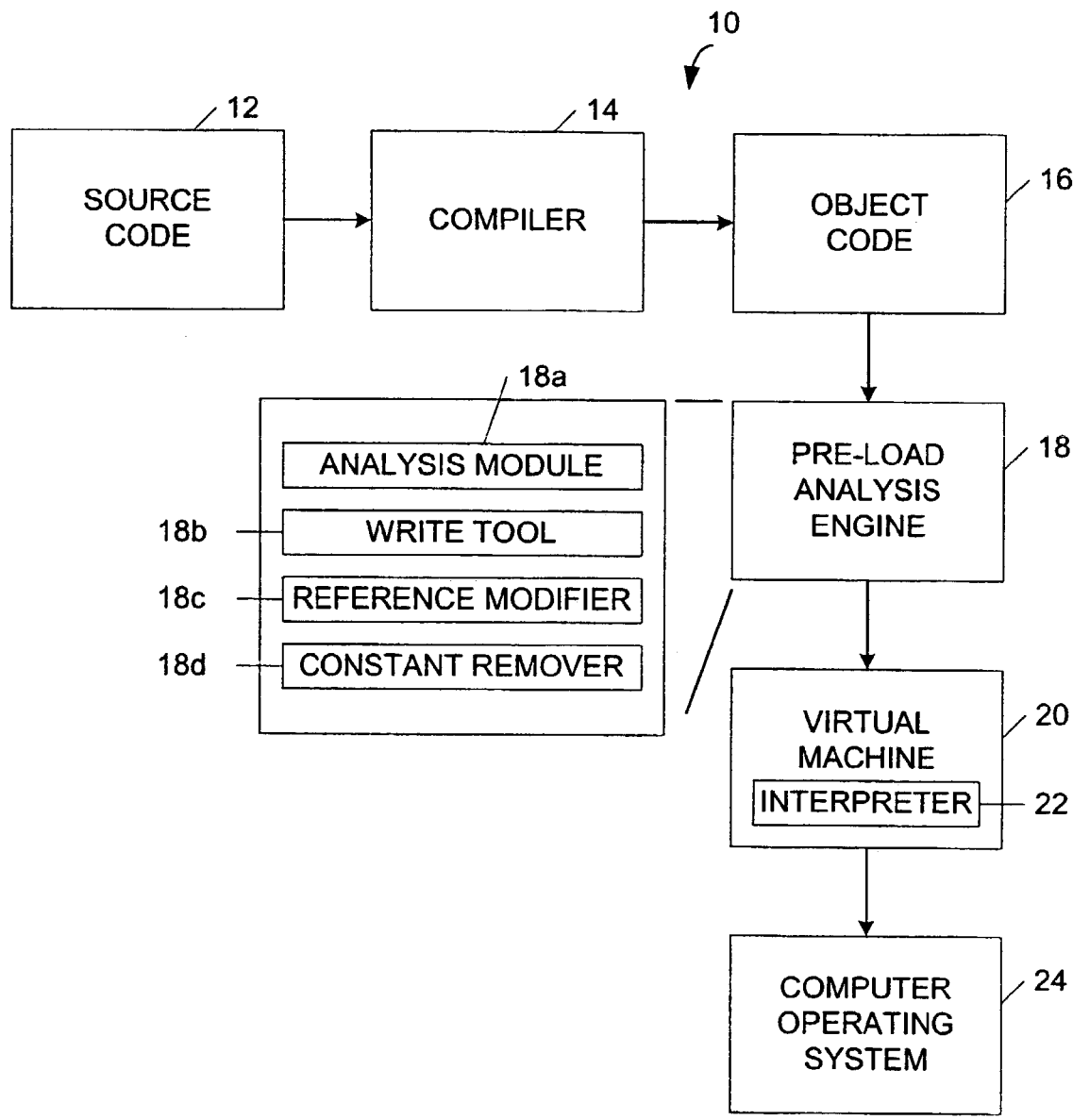
FIG. 1 is a flow diagram showing a typical process of compiling, analyzing, and interpreting a program in a computing environment of one embodiment of the invention.

Before embodiments of the invention are explained, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting. The following description assumes that the reader is familiar with computer science and has a working knowledge of virtual machines and dynamically-linked languages, as one of ordinary skill in the art would possess.

FIG. 1 illustrates various components of a computing environment 10. The computing environment 10 includes source code 12 written by the programmer. The source code 12 is translated or compiled into object code 16 by a compiler 14. The object code 16 is run through a pre-load analysis engine 18. The pre-load analysis engine 18 includes an analysis module 18a, a write tool 18b, a reference modifier 18c, and a constant remover 18d. The operation of these modules will be discussed in greater detail below.

Once the pre-load analysis engine 18 has been completed, the object code 16 is loaded into a virtual machine 20 where it is verified and interpreted. An interpreter 22 translates the object code 16 into machine code. The machine code is executed by the virtual machine 20. The virtual machine interacts with an operating system 24 of a host computer, which ultimately runs the virtual machine and handles input and output functions. One advantage of a virtual machine computing environment is that most virtual machines verify and load the load-units into the virtual machine up front or delay verifying and loading until the load-units are needed by the interpreter. This flexibility allows more complex programs to be run without the memory requirements typically associated with complex programs run in a compile-all-at-once-fashion, because unlike fully-compiled programs, a program run on a virtual machine does not need to be loaded all at once.

Figure 2:
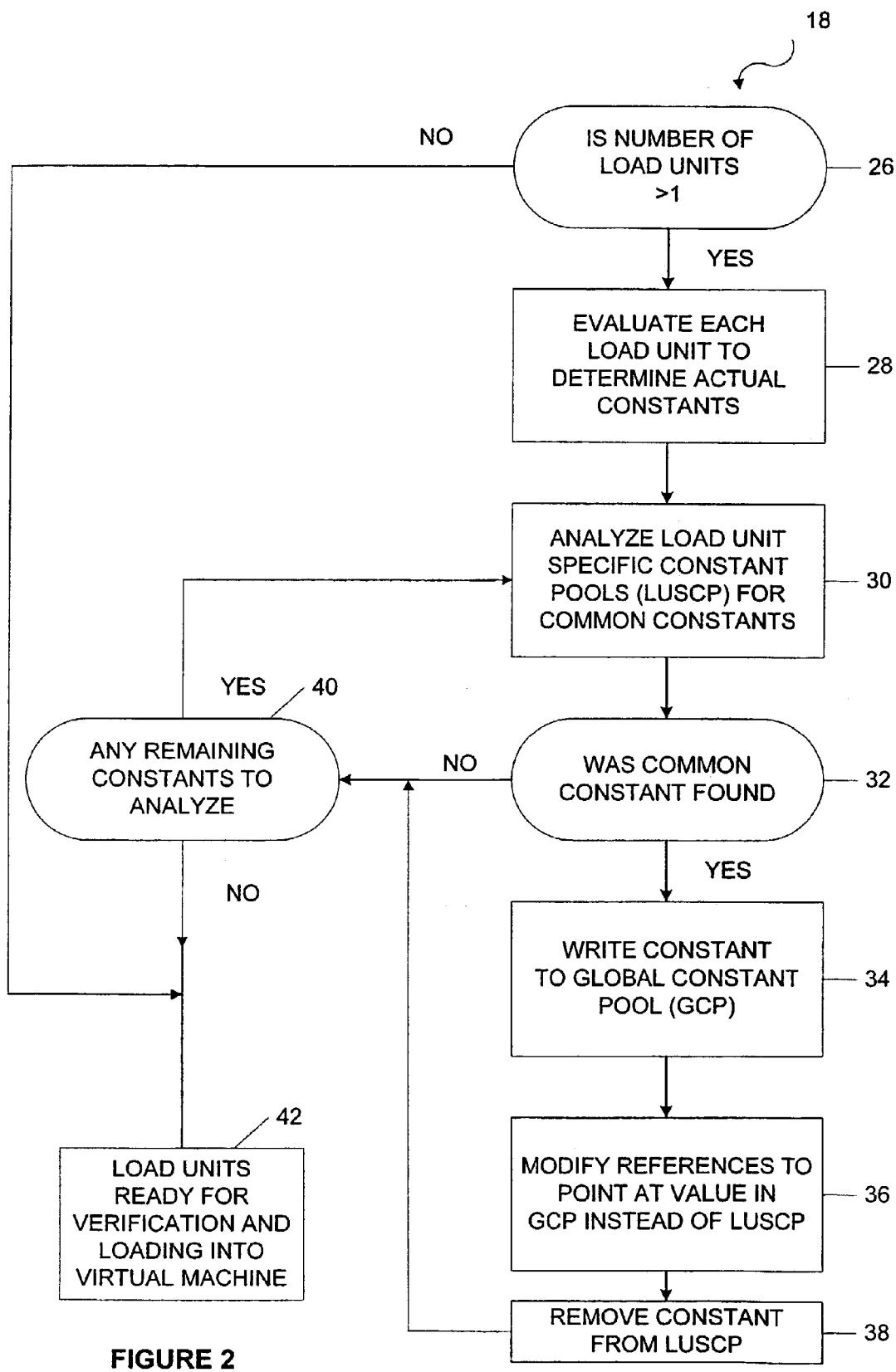
FIG. 2 is a flow chart of the processing that occurs in the pre-load analysis of one embodiment of the invention.

FIG. 2 illustrates a flow chart of the processing that occurs in the pre-load analysis engine 18. As shown at step 26, the number of load-units is determined. If the number of load-units is not greater than one, the use of a global constant pool does not provide any memory savings. A constant could not be considered common (as defined below) if it is located in only one load-unit. Additionally, the use of a global constant pool for a single load-unit would only move the location of the one instance of the constant. If only a small number of load-units are present in the object code 16, a balance must be made between the pre-load analysis engine 18 process time and the memory savings associated with the processing. In some instances, the use of a global constant pool does not generate significant memory savings and, therefore, should not be used.

Figure 3:
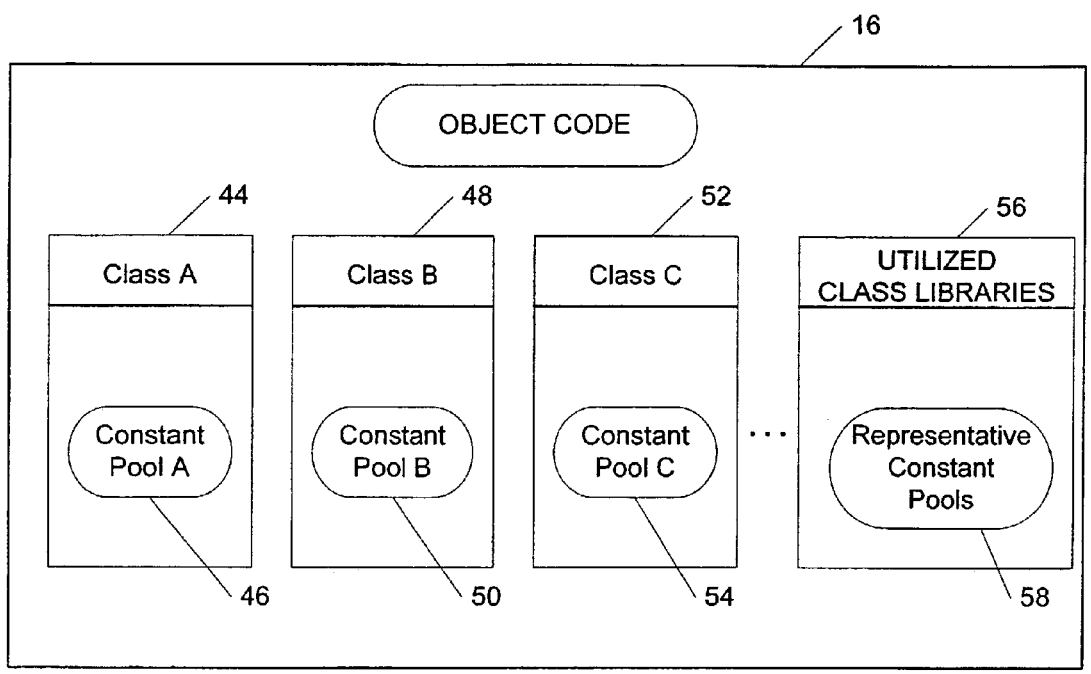
FIG. 3 is a schematic diagram illustrating the structure of the load-units located in the object code according to one embodiment of the invention.

FIG. 3 schematically illustrates object code 16 having a number of load-units 44, 48, 52, and 56. Each load-unit or class 44, 48, 52, and 56 is represented by a separate data structure.

Each class 44, 48, 52, and 56 includes a header, a load-unit specific constant pool 46, 48, 50, and 58, respectively, and other references to entities not independent of the given load-unit. The class 56 is actually a collection of classes that contain prewritten functions. The dynamic linker scans the code to determine which classes or portion of classes from the class 56 are utilized and discards the rest. Each class utilized from the class library 56 has a structure similar to the classes 44, 48, and 52 created by the programmer. Therefore, depending upon the programmer's use of the prewritten functions in the class 56, a representative number of load-unit specific constant pools 58 will be created. The classes from the class 56 are treated the same as programmer created classes 44, 48, and 52 by the pre-load analysis engine 18.

Referring back to FIG. 2, each load-unit currently located in memory is evaluated to determine whether it contains actual constants, as shown at step 28. As noted, elements that are not actually constant should not be placed in a constant pool. An element is not a constant if the runtime value varies and has a reference to an entity that is dependent on a given load-unit. For example, there may be name-space issues for some types of constants meaning that runtime values differ depending on the name-space the referring load-unit exists in. In order for a constant to be transferred from the load-unit specific constant pool to the global constant pool, the constant must be determined to be an actual constant. This is necessary to avoid the possibility of the value being changed in the global constant pool. If the constant value is changed in the global constant pool to accommodate one load-unit, another load-unit that also needs that common constant will receive an improper value.

At step 30 the load-unit specific constant pools are analyzed to determine which actual constants are redundant or common. For example, if the object code 16 of FIG. 3 was analyzed, all of the actual constants located in class 44, class 48, class 52, and the classes from the class library 56 would be compared to determine commonality. Commonality of the constants is determined at step 32 and involves determining whether two more occurrences of the same constant are found in the classes. The occurrence threshold can be adjusted depending upon the pre-load analysis engine 18 process time and the memory savings associated with that processing. If the memory footprint is extremely limited, a trade off between additional free memory and a loss of speed is desirable. If the memory available is unlimited, there is little if any incentive to utilize a global constant pool because memory efficiency does not result in any benefit except for the possible gain in time for verification and loading of the load-units into the virtual machine (as discussed below). The programmer needs to analyze the memory available and make the determination of what the threshold for commonality should be.

Figure 4:
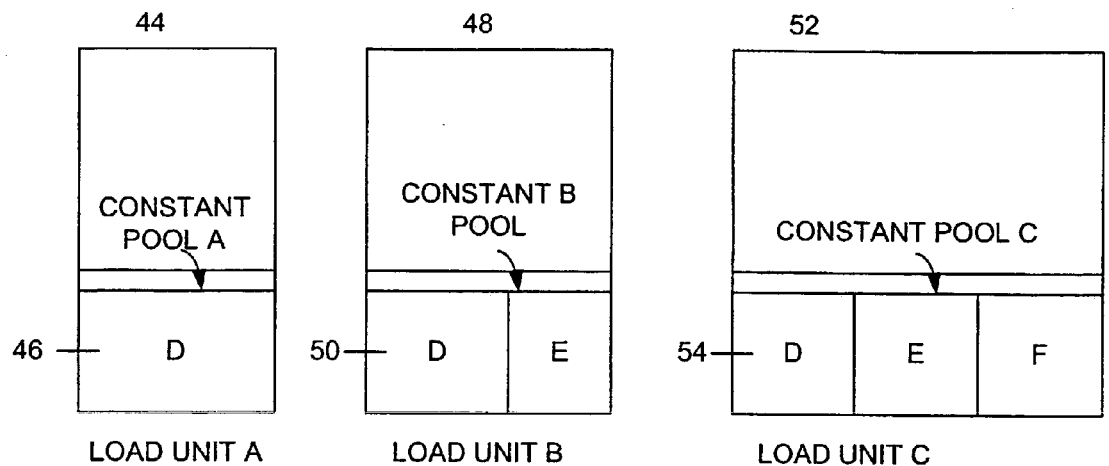
FIG. 4 is a schematic diagram illustrating a number of load-units before pre-load analysis according to one embodiment of the invention.
Figure 4:
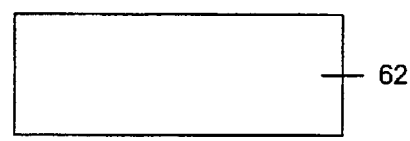

FIG. 4 illustrates the programmer created classes 44, 48, and 52 of the object code 16 before the pre-load analysis has occurred. The global constant pool 62 is also illustrated as an empty location of memory. Allocation of memory to the global constant pool 62 can be a predefined value or it can be determined on the fly. As illustrated, each load-unit or class 44, 48, and 52 has a constant pool 46, 50, and 54. Constant pool 46 includes a reference D, constant pool 50 includes the constant D and a constant E, and constant pool 54 includes the constants D and E and a constant F. In the example shown, it is assumed that each constant D, E, and F has been determined (as in step 28) to be an actual constant. Analyzing the constants in the classes 44, 48, and 52 according to the process laid out in FIG. 3 involves determining that D is a common constant (steps 30 and 32). The process also involves determining that E is a common constant, and that F is not a common constant. Therefore, F is not moved to the global constant pool 62 and the constants D and E are moved into the pool 62.

Figure 5:
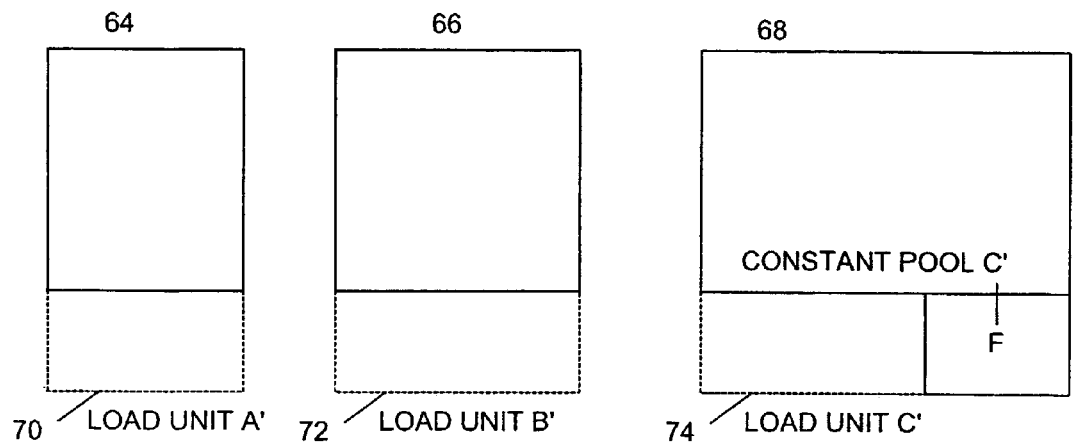
FIG. 5 is a schematic diagram illustrating a number of load-units and the global constant pool after pre-load analysis according to one embodiment of the invention.
Figure 5:
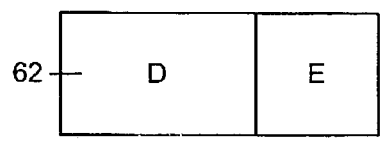

At step 34 the common constant is written to a global constant pool 62. After a constant is determined to be redundant or common in step 32, the constant is copied from the memory location of one of its instances (for example, common constant D is copied from constant pool 46 or from constant pool 48) and written to the memory allocated by the memory management tool to the global constant pool 62. FIG. 5 illustrates the load-units of FIG. 4 after the pre-load analysis. Load unit 64, load unit 66, and load unit 68 represent the content of the classes after the common constants have been processed according to the pre-load analysis discussed above. Global constant pool 62 contains the two constants D and E.

At step 36 the references in the load-unit that did point to an entity in the load-unit specific constant pools 44, 48, and 52 are rewritten to point to the entity's new location in the global constant pool 62. In terms of assembly code this would involve, for example, rewriting fragment LDC 14 (meaning load the constant value at entry 17 in the load-unit specific constant pool) to LDCG 523 (meaning load the constant value at entry 523 in the global constant pool). A different opcode is utilized to distinguish between loading a value from the load-unit specific constant pool and loading a unit from the global constant pool. As noted above, the constant that is moved can be either a simple value or it can be a complex operation. As long as the constant is determined to be a reference to an entity independent of the given load-unit that will not vary during runtime, it can be moved from the load-unit specific constant pool to the global constant pool.

At step 38 the common constant is removed from the load-unit specific constant pool. After the reference has been modified to point to the global constant pool 62 in step 36, the common constant located in the load-unit specific constant pool is no longer connected to anything. The common constant in the load-unit specific constant pool may be removed in one of two ways. In due course, the garbage collector will remove the non-referenced common constant, but it is more efficient to manually remove (with a simple and known delete routine applied to remove the common constant after the reference has been modified) each instance of the constant from each load-unit specific constant pool.

As noted, a single constant can be used in a number of load-units thousands of times resulting in a substantial memory requirement. Removal of the unneeded values results in substantial memory savings. Specifically, each load-unit is reduced in size by the amount of memory the constants that were removed previously occupied. Depending upon the memory management techniques used in the environment at hand, the overall memory location allocated to the load-unit may not change, but simply have additional free memory. It is possible to instruct the memory management tools to redistribute the freed up memory. However, it is not necessary to modify the memory management tool because if the memory is not automatically redistributed the memory management tools will eventually recognize the unused memory and reallocate it. Load-units 64, 66, and 68 illustrate this freed up memory with dotted lines.

Referring back to FIG. 2, step 40 of the pre-load analysis determines if further constants remain to be analyzed in the load-units. This step is accessed either after each instance of a common constant is removed from the load-unit specific constant pools in step 38 or after step 32 if no common constant was found. If constants do remain to be analyzed the pre-load analysis engine returns to step 30. If no constants remain to be analyzed the pre-load analysis is complete and the load-units are ready for verification and loading into the virtual machine 20, as shown at step 42.

The use of a global constant pool to allow for deletion of each instance of a common constant from load-unit specific constant pools decreases the memory requirements for a load-unit and decreases the time required for verification and loading of the load-units into the virtual machine 20. The amount of object code 16 to be interpreted is the same as was present before the pre-load analysis. The difference is in the interpretation of the object code 16 because references may point to the global constant pool memory location instead of pointing to the load-unit specific constant pool memory location.

As can be seen from the above, the invention provides a method and apparatus of utilizing a global constant pool to remove constants that have a commonality throughout a number of load-units. Various features and advantages of the invention are set forth in the following claims.

The invention claimed is:

1. A method of reducing runtime memory requirements of a virtual machine in a computer system having associated computer memory, the method comprising:
   (a) compiling source code within the associated computer memory to create object code, the object code including a plurality of load-units;
   (b) applying the object code to a pre-load analysis engine to determine a number of load units;
   (c) determining a threshold number of occurrences for a threshold comparison in accordance with a processing time of the pre-load analysis engine to provide an adjusted threshold;
   (d) analyzing each load unit of the plurality of load-units of the object code for common constants;
   (e) enumerating the common constants found in step (d);
   (f) creating a global constant pool;
   (g) writing a value of the common constants to the global constant pool in accordance with a comparison of (i) the enumeration of step (e) and (ii) the adjusted threshold;
   (h) modifying references pointing at the common constants to point at the value written to the global constant pool;
   (i) removing each instance of the common constants from the load-units; and
   (j) operating the computer system in accordance with the removing.

2. A method as claimed in claim 1, characterised characterized in that each load unit of the plurality of load-units includes a load-unit specific constant pool, the load-unit specific constant pool containing constants of its respective load unit.

3. A method as claimed in claim 1, characterised characterized in that removing each instance of the common constants from the load-units occurs immediately following modifying the references.

4. A method as claimed in claim 1, characterized in that removing each instance of the common constants from a load-units occurs when memory management tools recycle the associated computer memory formerly occupied by each instance of the common constants.

5. A method as claimed in claim 1, characterized in that each load unit of the plurality of load-units includes a load-unit specific constant pool, the load-unit specific constant pool containing constants of each of the load-units.

6. A method as claimed in claim 1, characterized in that the program module that removes each instance of the common constants from the load-units does so immediately following modifying the references.

7. A method as claimed in claim 1, characterized in that a program module that removes each instance of the common constants from the load-units does so when memory management tools recycle the associated computer memory formerly occupied by each instance of the common constants.

* * * * *